(No Model.)
H. M. ABBERCROMBIE.
CULTIVATOR.
No. 330,864. Patented Nov. 24, 1885.
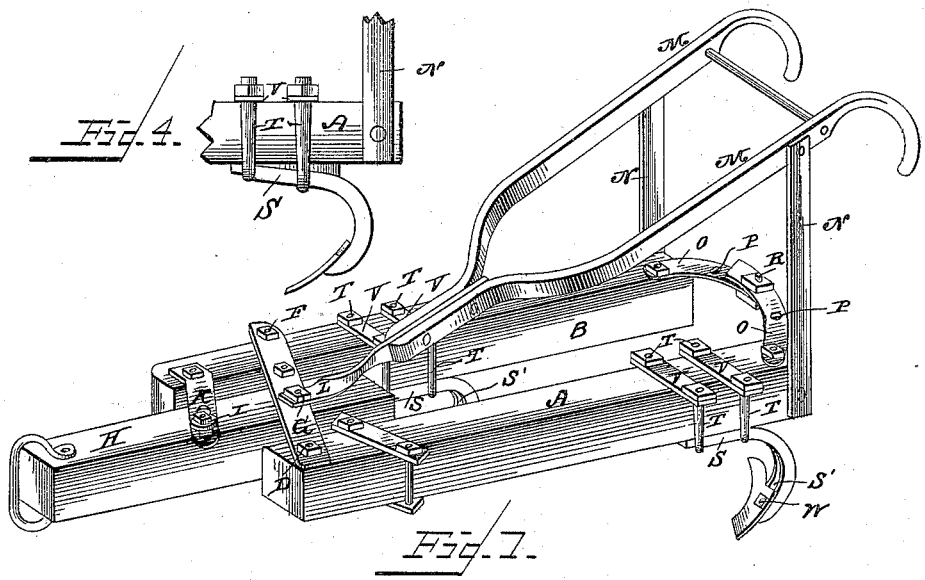
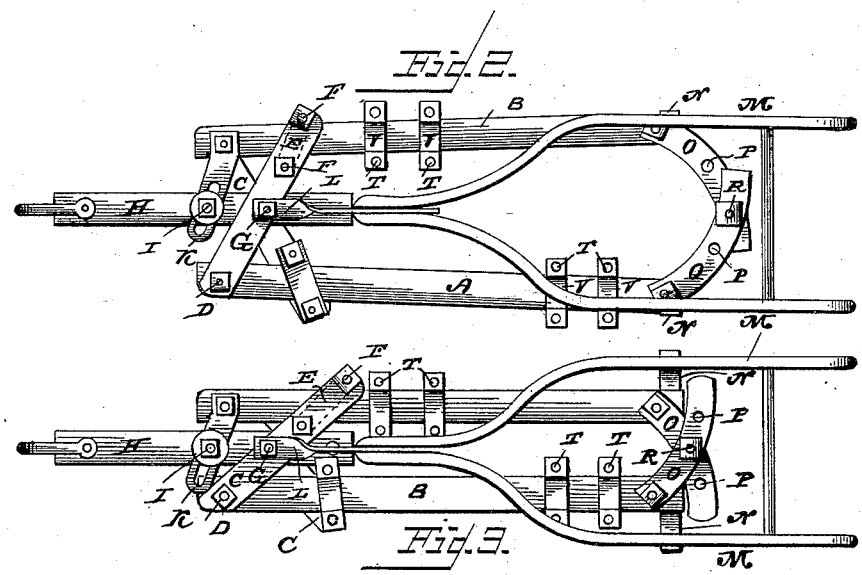
WITNESSES
C. W. Dashiell
J. W. Garner
INVENTOR
H. M. Abbercrombie
By his Attorneys
C. A. Snow & Co.

UNITED STATES PATENT OFFICE.

HENRY MUNROE ABBERCROMBIE, OF KELLY'S CREEK, ALABAMA.

CULTIVATOR.

SPECIFICATION forming part of Letters Patent No. 330,864, dated November 24, 1885.

Application filed June 16, 1885. Serial No. 168,893. (No model.)

*To all whom it may concern:*

Be it known that I, HENRY M. ABBERCROMBIE, a citizen of the United States, residing at Kelly's Creek, in the county of St. Clair and State of Alabama, have invented a new and useful Improvement in Cultivators, of which the following is a specification, reference being had to the accompanying drawings.

My invention relates to an improvement in cultivators; and it consists in the improved construction and combination of devices hereinafter fully described, and particularly pointed out in the claims.

In the drawings, Figure 1 is a perspective view of a cultivator embodying my invention. Fig. 2 is a top plan showing the side beams extended. Fig. 3 is a similar view with the side beams drawn in. Fig. 4 is a detail view.

A B represent the side beams of my cultivator, which are connected together at their front ends by means of diagonal bars C. These bars are bolted at their front ends to the front ends of the beams A B by the bolts D, and are secured at their rear ends to the beams A B by means of yokes E and bolts F. By releasing the nuts from the bolts F the bars C may be moved on the beams A B. A vertical bolt, G, extends up through the centers of the bars C, and on this bolt is pivoted a central draft-beam, H, to which the team is hitched. This beam is adapted to be moved at any desired angle with respect to the beams A B, so as to throw the draft upon either side of the cultivator, and is secured at any desired point by a bolt or set-screw, I, which passes through the slotted end of an arm, K, that is pivoted on the beam B.

On the upper end of the bolt G is secured a foot, L, to which are fastened the front ends of the bent handles M. These handles are connected near their rear ends to the rear ends of the beams A B by flexible standards N. The rear ends of the beams A and B are connected together by the curved arms O, which are pivoted thereto, and are provided with a series of openings, P, in their free ends. A bolt, R, is adapted to pass through these openings and secure the curved arms together at any desired point. It will be seen from this construction that the beams A and B may be adjusted laterally with relation to each other, and that when so adjusted the outer ends of the connecting-rods C and of the curved arms O are always maintained in their original positions with respect to the side beams.

I am aware that cultivators have been heretofore constructed having their side beams connected by cross-bars, which enable them to be adjusted laterally with relation to each other; but when said beams are brought near together, in order to narrow the spaces between the cultivator-teeth, the ends of the cross-bars project beyond the sides of the side beams in the way of the corn or other plants that are being cultivated. This objection I overcome by my construction.

S represents curved standards, which are secured to the under sides of the side beams by means of U-shaped bolts T and yokes V. These standards are slotted, as at S', and through these slots extend bolts W, that are employed for clamping the cultivator-teeth to the standards. By loosening the nuts on the bolts W the cultivator-teeth may be moved upward or downward on the standards and adjusted at any desired point thereon. If it is desired to change the angle at which the cultivator-teeth enter the ground, it is only necessary to loosen the nuts on the U-shaped bolts and insert the wedges Z between the beams and the standards, as shown in Fig. 3.

Having thus described my invention, I claim—

1. In a cultivator, the combination of the side beams, A B, carrying the cultivator-teeth, the diagonal cross-bars C, secured by pivotal bolts at their front ends to the front ends of the side beams and secured at their rear ends to said side beams by bolts F, the draft-beam pivoted on a bolt between the diagonal cross-beams, and the arm K, pivoted to one of the side beams and having its free end slotted, and a bolt passing through the slot in arm K and entering the draft-beam, whereby the latter may be adjusted, substantially as described.

2. In a cultivator, the combination of the side beams, the diagonal cross-bars pivoted to the side beams at one end and having their free ends adjustably secured thereto, said bars being crossed, the bars O, connecting the rear ends of the side beams, and means for clamping said bars together at any desired point, whereby the side beams may be adjusted laterally, and the handles having foot L, secured by bolt G, passing through the intersecting portions of the diagonal cross-bars, substantially as described.

In testimony that I claim the foregoing as my own I have hereto affixed my signature in presence of two witnesses.

HENRY MUNROE ABBERCROMBIE.

Witnesses:
 JNO. B. BASS,
 R. A. COX.